(12) United States Patent
Zheng (10) Patent No.: US 11,703,216 B2
(45) Date of Patent: Jul. 18, 2023

(54) LIGHT-EMITTING COMPOSITE STONE AND TABLE MANUFACTURED FROM SAME

(71) Applicant: BestTime LLC, Syracuse, UT (US)

(72) Inventor: Huizhang Zheng, Quanzhou (CN)

(73) Assignee: BESTTIME LLC, Syracuse, UT (US)

( * ) Notice: Subject to any disclaimer, the term of this patent is extended or adjusted under 35 U.S.C. 154(b) by 0 days.

(21) Appl. No.: 17/992,937

(22) Filed: Nov. 23, 2022

(65) Prior Publication Data

US 2023/0079729 A1    Mar. 16, 2023

(30) Foreign Application Priority Data

Aug. 11, 2022 (CN) .......................... 202210961696.9

(51) Int. Cl.
| | |
|---|---|
| *F21V 33/00* | (2006.01) |
| *A47B 13/12* | (2006.01) |
| *F21V 31/00* | (2006.01) |
| *F21V 8/00* | (2006.01) |
| *F21Y 115/10* | (2016.01) |
| *F21W 131/301* | (2006.01) |

(52) U.S. Cl.
CPC .......... *F21V 33/0012* (2013.01); *A47B 13/12* (2013.01); *F21V 31/005* (2013.01); *G02B 6/001* (2013.01); *F21V 2200/13* (2015.01); *F21V 2200/40* (2015.01); *F21W 2131/301* (2013.01); *F21Y 2115/10* (2016.08); *G02B 6/0096* (2013.01)

(58) Field of Classification Search
CPC .............. F21V 33/0012; F21V 31/005; F21V 2200/13; F21V 2200/40; A47B 13/12; A47B 2220/0077; A47B 13/08; G02B 6/001; G02B 6/0096; G02B 6/0028; G02B 6/0086; G02B 6/0095; F21W 2131/301; F21Y 2115/10
See application file for complete search history.

(56) References Cited

U.S. PATENT DOCUMENTS

| | | | |
|---|---|---|---|
| 10,724,250 B2* | 7/2020 | Mueller | ..................... F21S 4/24 |
| 2009/0116241 A1* | 5/2009 | Ashoff | ................... G02B 6/005 |
| | | | 362/253 |
| 2017/0356686 A1* | 12/2017 | Xue | ..................... F25D 31/007 |
| 2019/0391316 A1* | 12/2019 | Masuda | ............... G02B 6/0076 |

\* cited by examiner

*Primary Examiner* — Tsion Tumebo
(74) *Attorney, Agent, or Firm* — Chun-Ming Shih; Lanway IPR Services (57) ABSTRACT

A light-emitting composite stone includes a transparent stone; a first light guide; a mounting member; an edge stone on one side of the transparent stone; a second light guide being adjacent to an inner surface of the edge stone and perpendicular to the first light guide; a light-emitting member on a bottom of the second light guide; an inclined cut on the second light guide; a first reflection member having an inclined angle of 45-degree on a bottom of the inclined cut; first and second vertical light guides; a second reflection member on a top of the first vertical light guide; a horizontal light guide between tops of the first and second vertical light guides; a third reflection member on an inner surface of a top of the second vertical light guide; and a fourth reflection member on the horizontal light guide.

12 Claims, 8 Drawing Sheets

LIGHT-EMITTING COMPOSITE STONE AND TABLE MANUFACTURED FROM SAME

FIELD OF THE INVENTION

The invention relates to engineered stone and more particularly to a light-emitting composite stone and table manufactured from same.

BACKGROUND OF THE INVENTION

Natural stone has been widely used as a building or home material due to its natural texture and aesthetics. Many dining tables, tables and bar tables are manufactured from non-natural stone now. A back-lit light is typically provided on the back of a stone product so that the product can be more aesthetic when light is impinged thereon.

There is a stone product having a light guide on its back. A light-emitting layer of the light guide is adapted to emit light to the tone in order to carry out a back light effect. Chinese Patent Publication No. CN 216446334U discloses a composite stone capable of emitting uniform light and comprises a stone member and a peripheral member on edges of the stone member. A groove for accommodating a light guide is formed in both the stone member and the peripheral member. There is a gap between the light guide and the peripheral member with light-emitting diodes (LEDs) disposed therein. The LEDs may emit light toward the light guide.

However, the light cannot emit to whole area of the stone member because the light guide is disposed in the groove. There are dark areas on edges of the stone member and on the top of the edge stone. This adversely affect the light emitting capability of the composite stone of the Patent Publication. Additional LEDs may be disposed in the groove to increase light emitting to both the edges of the stone member and the peripheral member. However, the light emitted by the LEDs are directly impinged on the stone member without passing through the light guide. Thus, the light shown on the stone member is uneven. That is, more light is emitted on the stone member proximate the LEDs and less light is emitted on the stone member distal the LEDs. Further, additional LEDs increases the manufacturing cost. Furthermore, heat dissipation of the groove is poor due to the additional LEDs, resulting in malfunction.

Thus, the need for improvement still exists.

SUMMARY OF THE INVENTION

The invention has been made in an effort to solve the problems of the conventional art including the dark areas and uneven emitted light by providing a light-emitting composite stone and table manufactured from same having novel and nonobvious characteristics.

To achieve above and other objects of the invention, the invention provides a light-emitting composite stone, comprising from top to bottom a transparent stone; a first light guide; a mounting member; an edge stone disposed on one side of the transparent stone and extending downward; a second light guide disposed adjacent to an inner surface of the edge stone, extending downward, and being perpendicular to the first light guide; a light-emitting member disposed on a bottom of the second light guide and configured to emit light toward the second light guide; an inclined cut disposed on a top of the second light guide; a first reflection member having an inclined angle of 45-degree disposed on a bottom of the inclined cut, the first reflection member configured to reflect light emitted by the light-emitting member into the first light guide to generate horizontal rays; first and second vertical light guides with the inclined cut disposed therebetween wherein tops of the first and second vertical light guides are aligned with a top of the first light guide; a second reflection member disposed on a top of the first vertical light guide for reflecting portions of light emitted by the light-emitting member to a top edge of one side of the transparent stone wherein the second reflection member is at an angle A with respect to a vertical direction and $22.5° \leq A < 45°$; a horizontal light guide disposed between tops of the first and second vertical light guides; a third reflection member disposed on an inner surface of a top of the second vertical light guide for reflecting portions of vertical light emitted from the light-emitting member into the horizontal light guide to generate horizontal rays; and a fourth reflection member disposed on the horizontal light guide for reflecting horizontal rays from the horizontal light guide to a top of the transparent stone wherein the fourth reflection member is at an angle B with respect to a horizontal direction and $22.5° \leq B < 45°$.

In a preferred embodiment, the second reflection member comprises a plurality of joined first reflection elements each having a different angle with respect to the vertical direction; an angle A of the first reflection element with respect to the vertical direction is defined by $22.5° \leq A < 45°$; and the angle A of the first reflection element with respect to the vertical direction is increased from top to bottom.

In a preferred embodiment, the fourth reflection member comprises a plurality of joined second reflection elements each having a different angle with respect to the horizontal direction; an angle B of the second reflection element with respect to the horizontal direction is defined by $22.5° \leq B < 45°$; and the angle B of the second reflection element with respect to the horizontal direction is increased from top to bottom.

In a preferred embodiment, the transparent stone has an angle of 45-degree with respect to a joining portion of two edges thereof; a top of the edge stone is formed with a 45-degree angle and the edge stone is secured to the second light guide; and the 45-degree angle is spaced from the joining portion of the two edges of the transparent stone.

In a preferred embodiment, there is further provided an arc formed between an edge of the transparent stone and a top of the edge stone.

In a preferred embodiment, widths of the first and second vertical light guides are equal.

In a preferred embodiment, a projection of the first reflection member on a side of the first light guide has a width equal to ½-¾ of a height of the first light guide.

In a preferred embodiment, the second light guide is secured to the mounting member.

In a preferred embodiment, the light-emitting member is an LED secured to a bottom of the second light guide and parallel to the transparent stone.

In a preferred embodiment, the first light guide is a solid or hollow cylinder.

In a preferred embodiment, there is further provided a sealing member releasably disposed on a bottom of the second light guide, the sealing member including a receptacle with the light-emitting member fastened therein.

The invention further provides a table manufactured from one of the light-emitting composite stones described above, comprising a tabletop; a support member for supporting the tabletop wherein the support member is secured to an intermediate portion of an underside of the tabletop; and a plurality of light-emitting members each projecting out of a joining portion of the tabletop and the support member.

The light-emitting composite stone of the invention has the following advantageous effects in comparison with the prior art:

The inclined cut is disposed on a top of the second light guide. The first reflection member having an inclined angle of 45-degree is disposed on a bottom of the inclined cut. The first and second vertical light guides are provided with the inclined cut disposed therebetween. Tops of the first and second vertical light guides are aligned with a top of the first light guide. The second reflection member is disposed on a top of the first vertical light guide. The horizontal light guide disposed between tops of the first and second vertical light guides. The third reflection member is disposed on an inner surface of a top of the second vertical light guide. The fourth reflection member is disposed on the horizontal light guide. Light emitted by the light-emitting member is directed to inside of the second reflection member and further disperses to and illuminates the edge stone. Most portions of the light is reflected by the first reflection member to generate horizontal rays directed to the first light guide so that the transparent stone above the first light guide is lit. Portions of the light is reflected by the second reflection member on the top of the first vertical light guide. The second reflection member is at an angle between 22.5° and 45° with respect to the vertical direction. Thus, the portions of the light reflected by the second reflection member are directed obliquely, upward to illuminate the top of the edge stone. Likewise, portions of the reflected light are reflected by the third reflection member on the top of the second vertical light guide to generate horizontal rays into the horizontal light guide. And in turn, the horizontal rays are reflected by the fourth reflection member and obliquely emit so that the transparent stone can be illuminated. The light-emitting composite stone of the invention is characterized by improving the second light guide, provided a plurality of reflection members, reflecting light emitted by the light-emitting member toward different directions, and uniformly illuminate both the edge stone and the transparent stone. The conventional dark areas on the edges of the stone member and on the top of the edge stone are eliminated, thereby increasing light-emitting effect of the light-emitting composite stone.

A replacement of the malfunctioned light-emitting member is made easy by unfastening the sealing member and replacing the malfunctioned light-emitting member with a new light-emitting member.

The above and other objects, features and advantages of the invention will become apparent from the following detailed description taken with the accompanying drawings

DETAILED DESCRIPTION OF THE INVENTION

Referring to FIGS. 1 to 4, a light-emitting composite stone in accordance with a first preferred embodiment of the invention comprises the following components from top to bottom as discussed in detail below.

Figure 1:
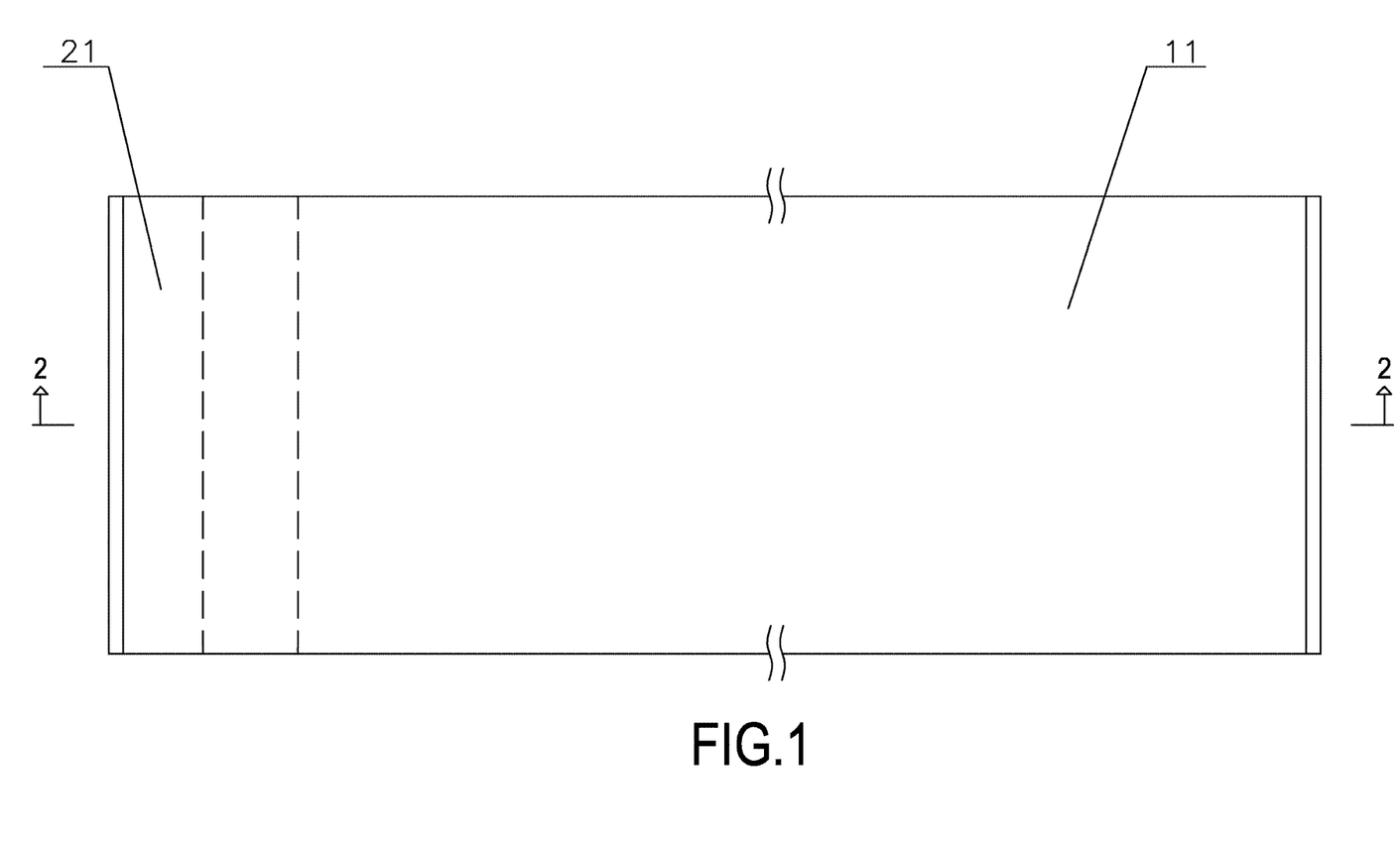
FIG. 1 is a top plan view of a light-emitting composite stone according to a first preferred embodiment of the invention.
Figure 2:
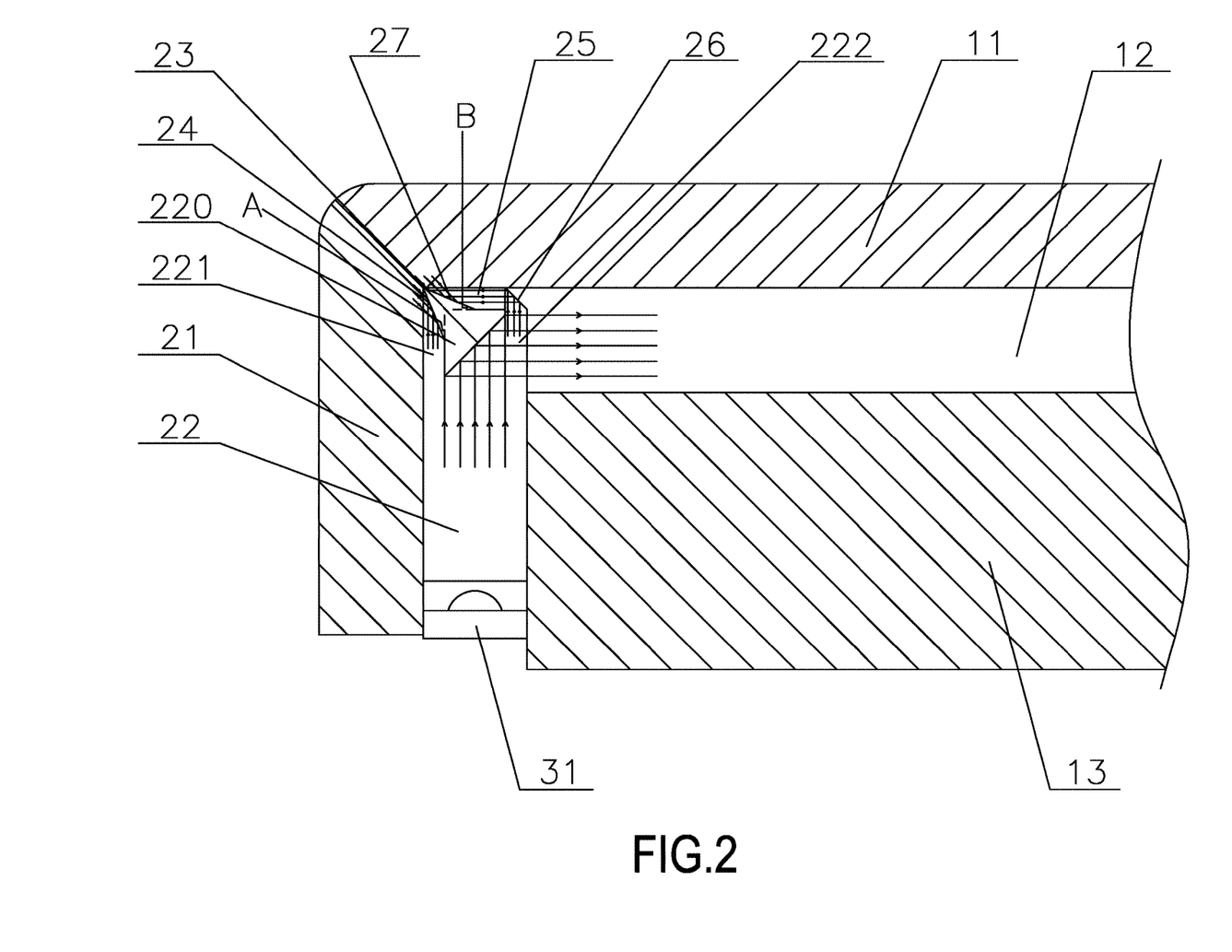
FIG. 2 is a sectional view taken along line 2-2 of FIG. 1.

A transparent stone 11, a first light guide 12 and a mounting member 13 are disposed. In the embodiment, the transparent stone 11, the first light guide 12 and the mounting member 13 all are rectangular. The transparent stone 11 is selected from natural granite, marble, sandstone, semi-precious stones, quartz stone, or a combination thereof.

As shown in FIG. 2 specifically, one side of the transparent stone 11 is disposed with an edge stone 21 which extends downward. Alternatively, each of two sides and two ends of the transparent stone 11 are disposed with an edge stone 21 for aesthetic purpose. In the embodiment, a second light guide 22 is disposed adjacent to an inner surface of the edge stone 21 and extends downward. Further, the second light guide 22 is perpendicular to the first light guide 12. A light-emitting member 31 is disposed on a bottom of the second light guide 22 and is configured to emit light toward the second light guide 22.

For increasing intensity of back light, another second gg 22 is disposed on an inner surface of each side or end and is secured to the first light guide 12.

As shown in FIG. 2 specifically, in the embodiment, the transparent stone 11 has an angle of 45-degree with respect to a joining portion of two edges (i.e., corner). A top of the edge stone 21 is formed with a 45-degree angle and the edge stone 21 is secured to the second light guide 22. The 45-degree angle is spaced from the corner of the transparent stone 11. An arc is formed between an edge of the transparent stone 11 and a top of the edge stone 21.

As shown in FIG. 2 specifically, a top of the second light guide 22 is disposed with an inclined cut 220. A first reflection member 23 having an inclined angle of 45-degree is disposed on the inclined cut 220. The first reflection member 23 reflects light emitted by the light-emitting member 31 into the first light guide 12 to generate horizontal rays.

As shown in FIG. 2 specifically, two sides of the second light guide 22 are disposed with a first vertical light guide 221 and a second vertical light guide 222 respectively with the inclined cut 220 disposed therebetween. Widths of the first and second vertical light guides 221, 222 are equal. Tops of the first and second vertical light guides 221, 222 are aligned with a top of the first light guide 12. A second reflection member 24 is disposed on a top of the first vertical light guide 221 for reflecting portions of vertical light emitted by the light-emitting member 31 to a top edge of one side of the transparent stone 11. A top of the second reflection member 24 is on an inner surface of a joining portion of the transparent stone 11 and the edge stone 21. The second reflection member 24 is at an angle A with respect to a vertical direction and $22.5° \leq A < 45°$.

Figure 3:
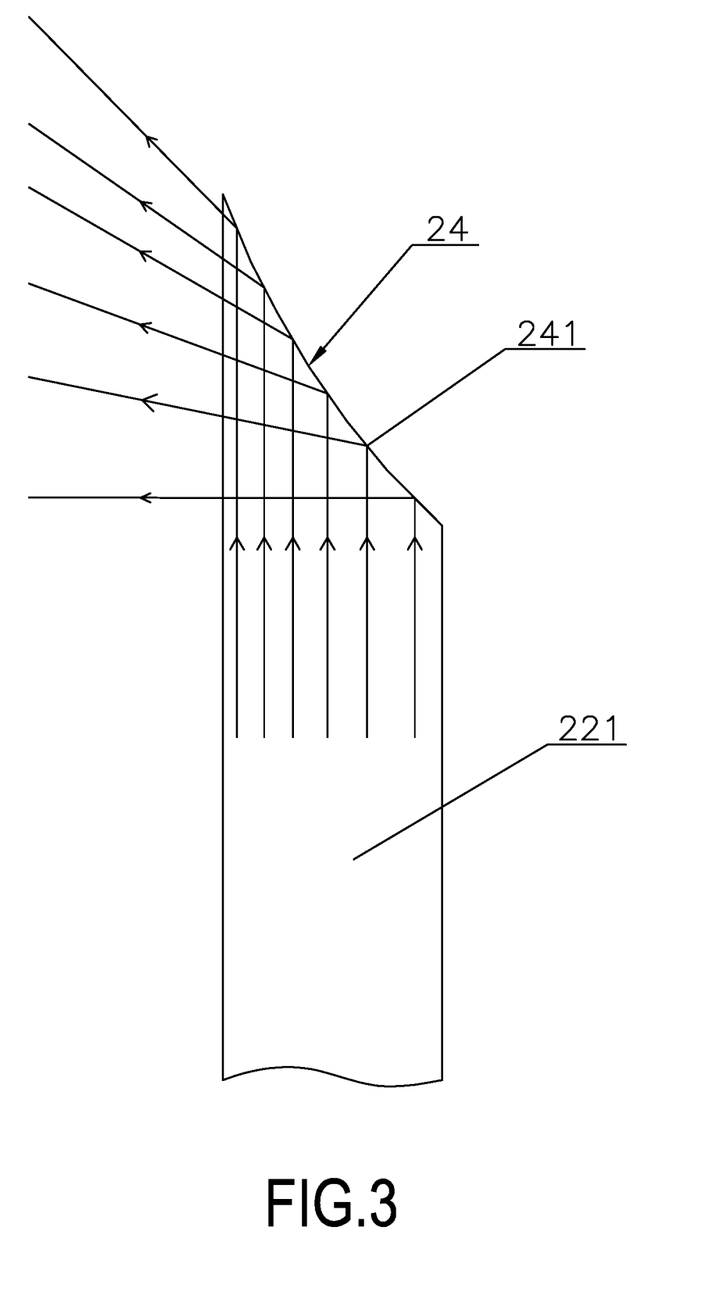
FIG. 3 schematically depicts the second reflection member.

As shown in FIG. 3 specifically, preferably, the second reflection member 24 comprises a plurality of joined first reflection elements 241 each having a different angle with respect to the vertical direction. The angle A of the first reflection element 241 with respect to the vertical direction is defined by 22.5°≤A<45°. Also, the angle A of the first reflection element 241 with respect to the vertical direction is increased from top to bottom. For A to be 22.5°, the reflection light is parallel to a joining portion (i.e., being 45-degree inclined) of the transparent stone 11 and the edge stone 21. The angle of the reflection light with respect to the vertical direction is increased as the A increases. That is, the reflection light is directed downward with respect to a top of the edge stone 21. The reflection light is emitted vertically from an outer surface of the edge stone 21 when A is 45°. This arrangement ensures that light is emitted uniformly from the edge stone 21, thereby giving an effect of uniform light on the a top of the edge stone 21.

As shown in FIG. 2 specifically, a horizontal light guide 25 is disposed between tops of the first and second vertical light guides 221, 222 and connected to the first light guide 12. A top of the horizontal light guide 25 is engaged with an underside of the transparent stone 11. A third reflection member 26 is disposed on an inner surface of a top of the second vertical light guide 222 for reflecting portions of vertical light emitted from the light-emitting member 31 into the horizontal light guide 25 to generate horizontal rays. A projection of the third reflection member 26 on the horizontal direction overlays lies over the horizontal light guide 25 in order to ensure that light emitted from the second vertical light guide 222 is reflected to the horizontal light guide 25.

As shown in FIG. 2 specifically, a fourth reflection member 27 is disposed on the horizontal light guide 25 for reflecting light from the horizontal light guide 25 to a top of the transparent stone 11. Tops of fourth reflection member 27 and the second reflection member 23 are joined. The fourth reflection member 27 is at an angle B with respect to a horizontal direction and 22.5°≤B<45°.

Figure 4:
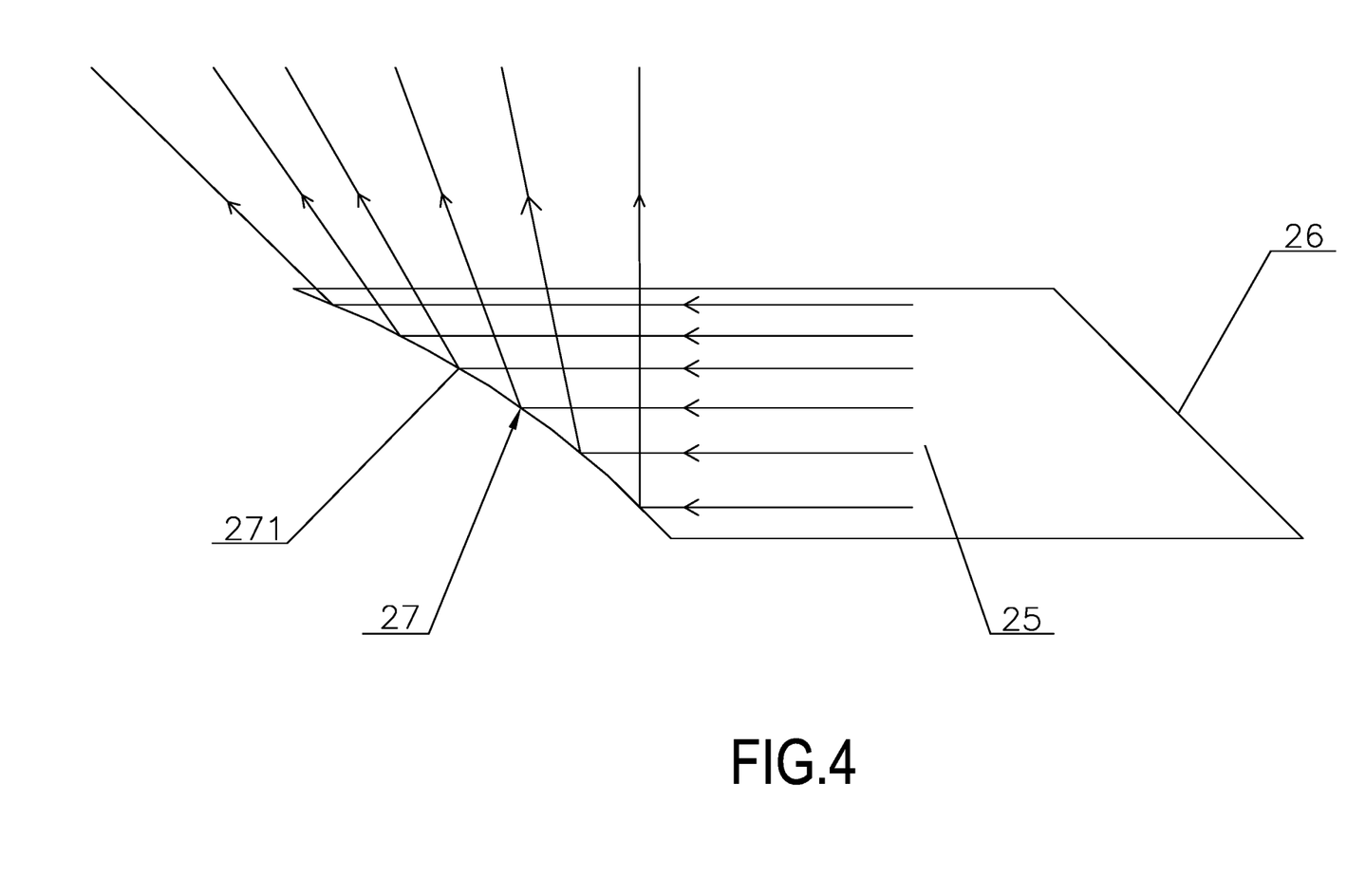
FIG. 4 schematically depicts the fourth reflection member.

As shown in FIG. 4 specifically, preferably, the fourth reflection member 27 comprises a plurality of joined second reflection elements 271 each having a different angle with respect to the horizontal direction. The angle B of the second reflection element 271 with respect to the horizontal direction is defined by 22.5°≤B<45°. Also, the angle of the second reflection element 271 with respect to the vertical direction is increased from top to bottom. For B to be 22.5°, the reflection light is parallel to a joining portion (i.e., being 45-degree inclined) of the transparent stone 11 and the edge stone 21. The angle of the reflection light with respect to the horizontal direction is increased as the B increases. That is, the reflection light from a top of the transparent stone 11 is directed downward with respect to the vertical direction. The reflection light is emitted vertically from an outer surface of the transparent stone 11 when B is 45°. This arrangement ensures that light is emitted uniformly from the transparent stone 11, thereby giving an effect of uniform light on the surface of the transparent stone 11.

As shown in FIG. 1 specifically, preferably, the light-emitting member 31 is an LED which is secured to a bottom of the second light guide 22 and parallel to the transparent stone 11. The LED is electrically connected to a 12V or 24V rechargeable battery (not shown).

For preventing light from emitting out of the second light guide 22, the second light guide 22 is secured to the mounting member 13. Alternatively, a reflective membrane is adhered to the surface of the second light guide 22.

Preferably, the mounting member 13 is an aluminum honeycomb for increasing structural strength of the composite stone of the invention.

Figure 5:
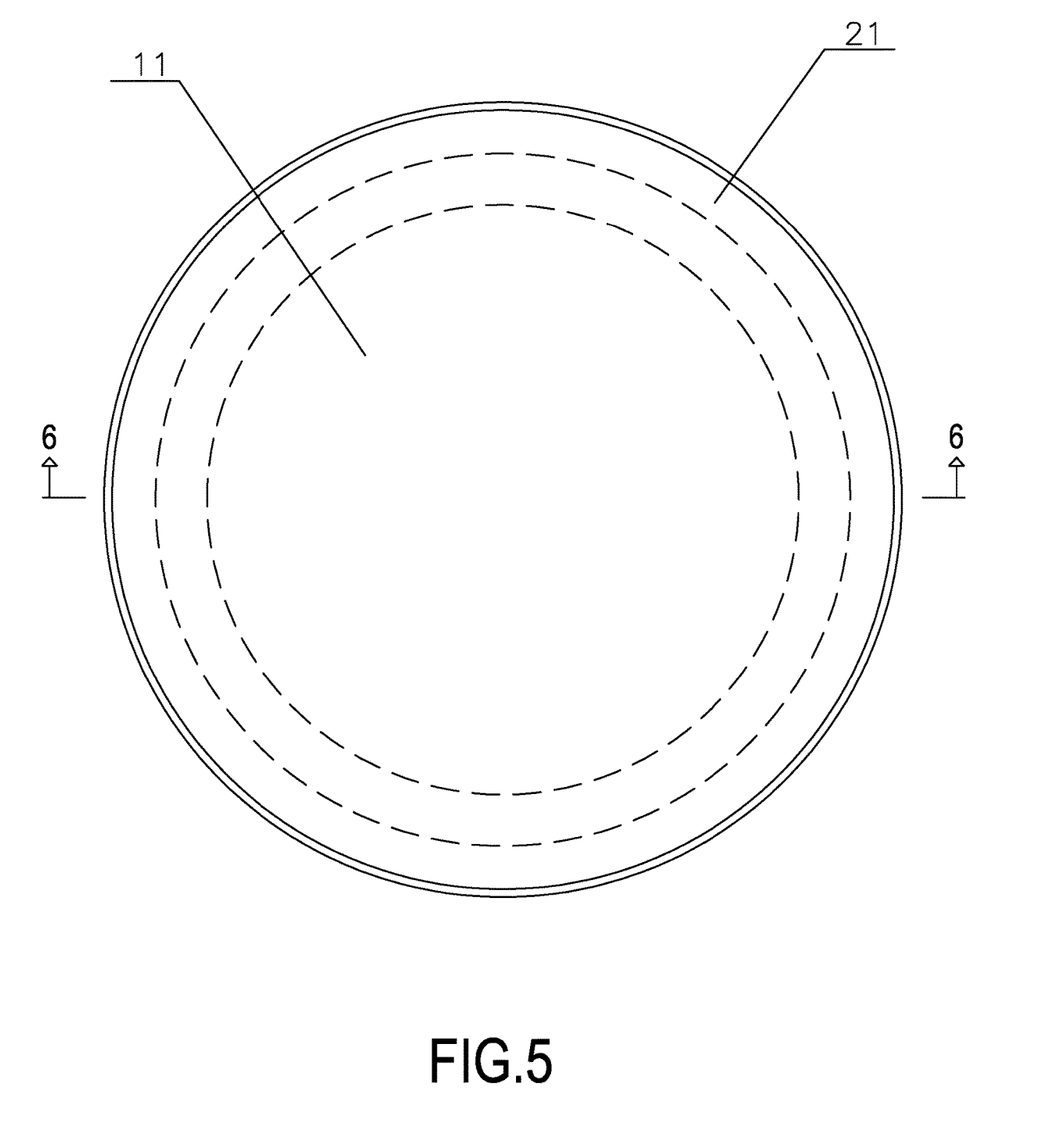
FIG. 5 is a top plan view of a light-emitting composite stone according to a second preferred embodiment of the invention.
Figure 6:
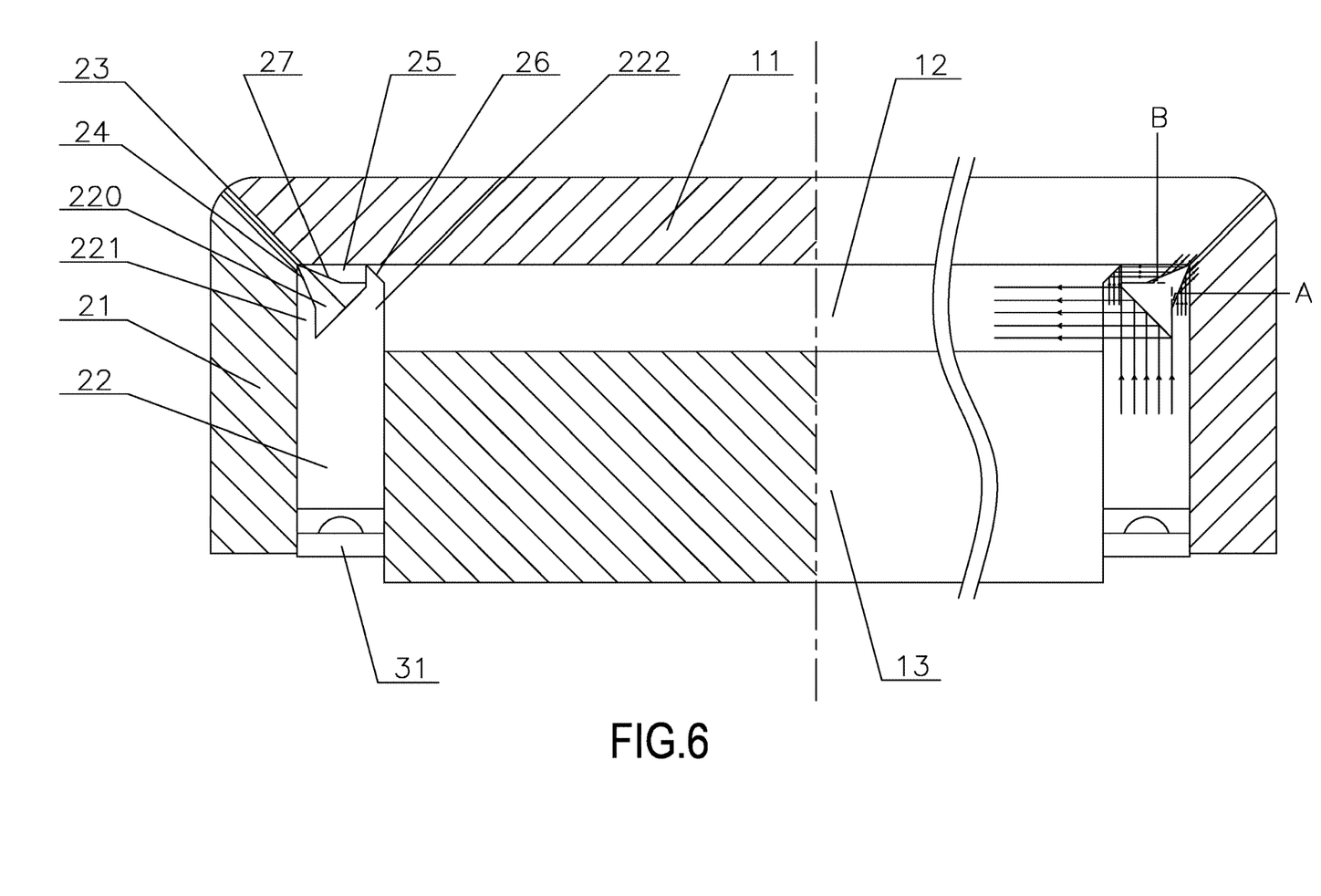
FIG. 6 is a sectional view taken along line 6-6 of FIG. 5.

Referring to FIGS. 5 and 6, a light-emitting composite stone in accordance with a second preferred embodiment of the invention is shown. The second embodiment comprises from top to bottom a transparent stone 11, a first light guide 12 and a mounting member 13. The characteristics of the second preferred embodiment are substantially the same as that of the first preferred embodiment except the following: the transparent stone 11 is round. Also, both the first light guide 12 and the mounting member 13 are round and concentric with the transparent stone 11. An edge stone 21 is disposed along a peripheral surface of the transparent stone 11. A second light guide 22 is disposed on an inner surface of the edge stone 21. Both the edge stone 21 and the second light guide 22 are cylindrical and joined.

On the second light guide 22 there are disposed first, second, third and third reflection members which are annular. Also, a horizontal light guide is annular.

A light-emitting member 31 is disposed on a bottom of the second light guide 22 and is configured to emit light toward the second light guide 22. Preferably, the light-emitting member 31 is an LED.

Figure 7:
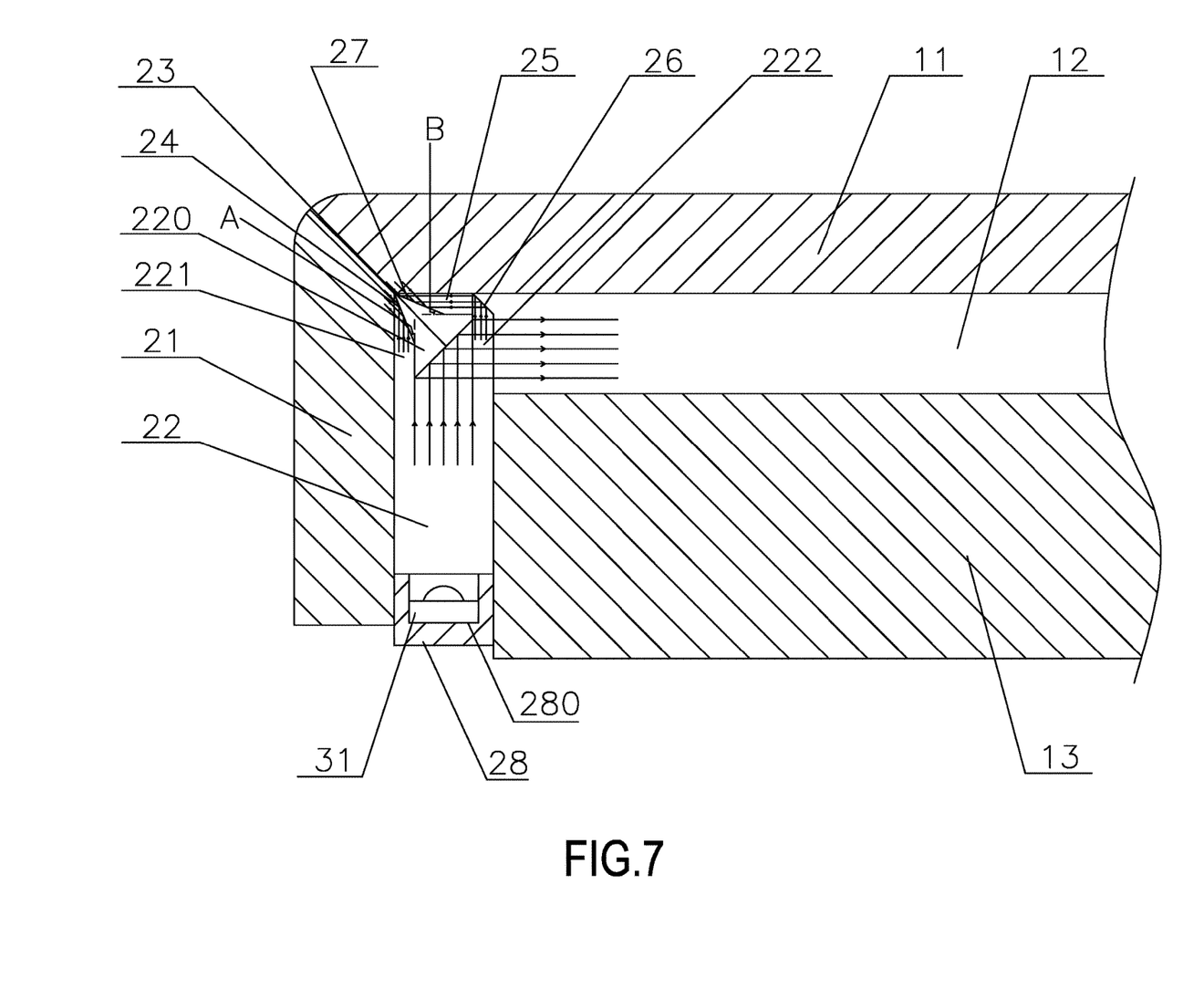
FIG. 7 is a sectional view of a light-emitting composite stone according to a third preferred embodiment of the invention.

Referring to FIG. 7, a light-emitting composite stone in accordance with a third preferred embodiment of the invention is shown. The characteristics of the third preferred embodiment are substantially the same as that of the first or second preferred embodiment except the following: A sealing member 28 made of aluminum is disposed on a bottom of the second light guide 22 and secured thereto by screws. Alternatively, the sealing member 28 is disposed on a bottom of the edge stone 21 or on a surface of the mounting member 13. A receptacle 280 is disposed in the sealing member 28 with the light-emitting member 31 fastened therein.

Regarding the composite stone of the embodiment, a replacement of the malfunctioned light-emitting member 31 is made easy by unfastening the sealing member 28 and replacing the malfunctioned light-emitting member 3 with a new light-emitting member 31.

Figure 8:
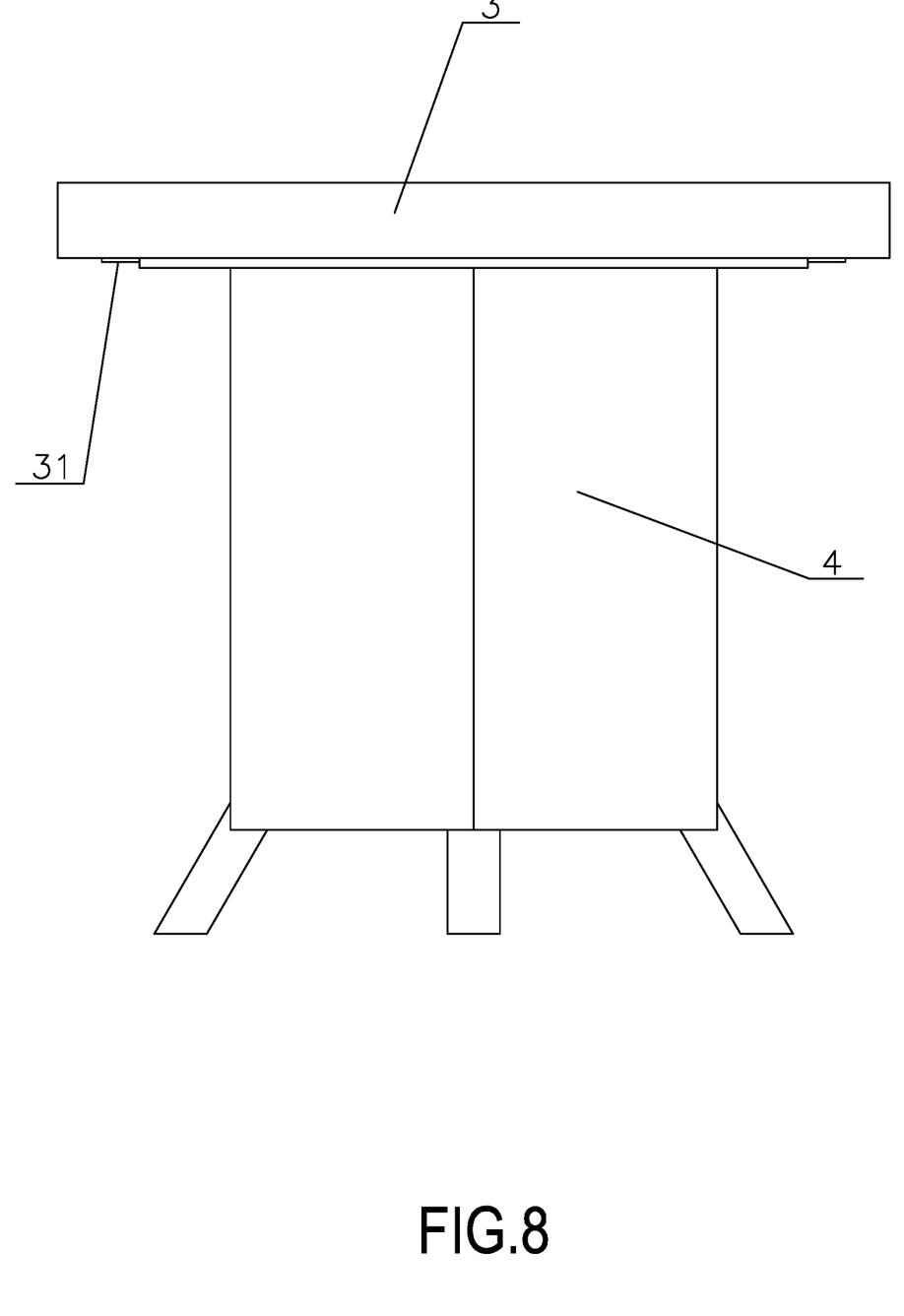
FIG. 8 is a side elevation of a table manufactured form the light-emitting composite stone according to the first, second or third preferred embodiment of the invention.

Referring to FIG. 8, a table of the invention is shown. The table is manufactured from the light-emitting composite stone of the first, second or third embodiment and comprises a tabletop 3 and a support member 4 for supporting the tabletop 3.

The support member 4 is secured to an intermediate portion of an underside of the tabletop 3 and comprises a plurality of leg elements (or a supporting structure and a plurality of leg elements disposed on a bottom of the supporting structure).

In the embodiment, each of the two light-emitting members 31 projects out of a joining portion of the tabletop 3 and the support member 4 so that a replacement of the malfunctioned light-emitting member 31 can be made easy.

While the invention has been described in terms of preferred embodiments, those skilled in the art will recognize that the invention can be practiced with modifications within the spirit and scope of the appended claims.

What is claimed is:
1. A light-emitting composite stone, comprising from top to bottom:
   a transparent stone;
   a first light guide;
   a mounting member;
   an edge stone disposed on one side of the transparent stone and extending downward;
   a second light guide disposed adjacent to an inner surface of the edge stone, extending downward, and being perpendicular to the first light guide;

a light-emitting member disposed on a bottom of the second light guide and configured to emit light toward the second light guide;

an inclined cut disposed on a top of the second light guide;

a first reflection member having an inclined angle of 45-degree disposed on a bottom of the inclined cut, the first reflection member configured to reflect light emitted by the light-emitting member into the first light guide to generate horizontal rays;

first and second vertical light guides with the inclined cut disposed therebetween wherein tops of the first and second vertical light guides are aligned with a top of the first light guide;

a second reflection member disposed on a top of the first vertical light guide for reflecting portions of the light emitted by the light-emitting member to a top edge of one side of the transparent stone wherein the second reflection member is at an angle A with respect to a vertical direction and $22.5° \leq A < 45°$;

a horizontal light guide disposed between tops of the first and second vertical light guides;

a third reflection member disposed on an inner surface of a top of the second vertical light guide for reflecting portions of light emitted from the light-emitting member into the horizontal light guide to generate horizontal rays; and a fourth reflection member disposed on the horizontal light guide for reflecting horizontal rays from the horizontal light guide to a top of the transparent stone wherein the fourth reflection member is at an angle B with respect to a horizontal direction and $22.5° \leq B < 45°$.

2. The light-emitting composite stone of claim 1, wherein the second reflection member comprises a plurality of joined first reflection elements each having a different angle with respect to the vertical direction; an angle A of the first reflection element with respect to the vertical direction is defined by $22.5° \leq A < 45°$; and the angle A of the first reflection element with respect to the vertical direction is increased from top to bottom.

3. The light-emitting composite stone of claim 1, wherein the fourth reflection member comprises a plurality of joined second reflection elements each having a different angle with respect to the horizontal direction; an angle B of the second reflection element with respect to the horizontal direction is defined by $22.5° \leq B < 45°$; and the angle B of the second reflection element with respect to the horizontal direction is increased from top to bottom.

4. The light-emitting composite stone of claim 1, wherein the transparent stone has an angle of 45-degree with respect to a joining portion of two edges thereof; a top of the edge stone is formed with a 45-degree angle and the edge stone is secured to the second light guide; and the 45-degree angle is spaced from the joining portion of the two edges of the transparent stone.

5. The light-emitting composite stone of claim 4, further comprising an arc formed between an edge of the transparent stone and a top of the edge stone.

6. The light-emitting composite stone of claim 1, wherein widths of the first and second vertical light guides are equal.

7. The light-emitting composite stone of claim 1, wherein a projection of the first reflection member on a side of the first light guide has a width equal to ½-¾ of a height of the first light guide.

8. The light-emitting composite stone of claim 1, wherein the second light guide is secured to the mounting member.

9. The light-emitting composite stone of claim 1, wherein the light-emitting member is an LED secured to a bottom of the second light guide and parallel to the transparent stone.

10. The light-emitting composite stone of claim 1, wherein the second light guide is a solid or hollow cylinder.

11. The light-emitting composite stone of claim 1, further comprising a sealing member releasably disposed on a bottom of the second light guide, the sealing member including a receptacle with the light-emitting member fastened therein.

12. A table manufactured from the light-emitting composite stone as claimed in claim 1, comprising: a tabletop; a support member for supporting the tabletop wherein the support member is secured to an intermediate portion of an underside of the tabletop; and a plurality of light-emitting members each projecting out of a joining portion of the tabletop and the support member.

* * * * *